United States Patent
Grabelkovsky

(10) Patent No.: US 8,990,558 B2
(45) Date of Patent: Mar. 24, 2015

(54) SECURING INFORMATION IN A CLOUD COMPUTING SYSTEM

(75) Inventor: Michael Grabelkovsky, Netanya (IL)

(73) Assignee: Safer Point Ltd, Katzrin (IL)

(*) Notice: Subject to any disclaimer, the term of this patent is extended or adjusted under 35 U.S.C. 154(b) by 154 days.

(21) Appl. No.: 13/572,701

(22) Filed: Aug. 13, 2012

(65) Prior Publication Data
US 2013/0117563 A1    May 9, 2013

Related U.S. Application Data

(60) Provisional application No. 61/628,896, filed on Nov. 9, 2011.

(51) Int. Cl.
*G06F 21/00* (2013.01)
*G06F 15/173* (2006.01)
*G06F 17/30* (2006.01)
*G06F 21/62* (2013.01)

(52) U.S. Cl.
CPC .............. *G06F 15/173* (2013.01); *G06F 17/30* (2013.01); *G06F 21/6218* (2013.01)
USPC ........................................................ 713/165

(58) Field of Classification Search
None
See application file for complete search history.

(56) References Cited

U.S. PATENT DOCUMENTS

| | | | |
|---|---|---|---|
| 6,751,735 B1 | 6/2004 | Schell et al. | |
| 7,277,941 B2 | 10/2007 | Ignatius et al. | |
| 2011/0131335 A1* | 6/2011 | Spaltro et al. | 709/228 |
| 2011/0161656 A1* | 6/2011 | Rao | 713/153 |
| 2011/0271279 A1 | 11/2011 | Pate | |
| 2011/0276806 A1 | 11/2011 | Casper et al. | |
| 2012/0096525 A1* | 4/2012 | Bolgert et al. | 726/6 |

* cited by examiner

*Primary Examiner* — David Le
(74) *Attorney, Agent, or Firm* — Symbus Law Group, LLC; Clifford D. Hyra

(57) ABSTRACT

The method and system for secure data (information) inside a cloud computing system, allow data to be encrypted everywhere in the cloud on storage devices and in communication lines so that only the information owner has the encryption key and may decrypt the data. The main idea is using software filter technology inside the cloud virtual machine for encrypting and decrypting data and keeping the encryption key(s) only in the hand of the owner of the information outside the cloud. The encryption key is loaded into the appropriate filter only by permission of the information owner or an allowed user. The method allows combination of data encryption with application control and user control.

20 Claims, 2 Drawing Sheets

SECURING INFORMATION IN A CLOUD COMPUTING SYSTEM

BACKGROUND

1. Technical Field

The present invention relates to the field of cloud computing, and more particularly, to security issues in cloud computing.

2. Discussion of Related Art

The following documents illustrate known methods and systems for encrypting data inside cloud computing systems. The patent documents and solutions that are listed below are incorporated herein by reference in their entirety.

U.S. Pat. No. 7,277,941 discloses a method for performing a storage operation in a pipeline storage system in which one or more data streams containing data to be stored are written into data chunks. The method includes generating an encryption key associated with a first archive file to be stored when encryption is requested for the storage operation, encrypting the archive data from the data stream using the encryption key to create an encrypted data chunk when a data stream containing the archive file is processed in the pipeline storage system, storing the encrypted data chunk on a storage medium, and storing the encryption key in a manner accessible during a restore operation of the encrypted data chunk.

U.S. Pat. No. 6,751,735 discloses an apparatus and method provide a controlled, dynamically loaded, modular, cryptographic implementation for integration of flexible policy implementations on policy engines, and the like, into a base executable having at least one slot. The base executable may rely on an integrated loader to control loading and linking of fillers and submodules. A policy module may be included for use in limiting each module's function, access, and potential for modification or substitution. The policy may be implemented organically within a manager layer or may be modularized further in an underlying engine layer as an independent policy, or as a policy created by a policy engine existing in an engine layer. The policy module is subordinate to the manager module in the manager layer in that the manager module calls the policy module when it is needed by the manager module. The policy module is preferably dynamically linkable, providing flexibility, and is layered deeper within the filler module than the manager module.

Furthermore, several commercial systems are provided for this field, including the following: Navajo Systems (www.navajosystems.com) discloses the technology which suggests implementation of Proxy Server which is installed between the end user's browser and the SaaS application server, either as an appliance on the enterprise LAN/WAN or as a cloud-based service. This solution is applied for some Cloud Systems too. S3 Backup (www.maluke.com/software/s3-backup) is a fail-safe, encrypted online backup solution is used for backup data in Amazon S3 Cloud. Dropbox (www.dropbox.com) uses Cloud as FTP server with option to encrypt data on Dropbox client. Check Point Ltd. File Encryption allows transparent file encryption "on the fly" on local disk and removable media with keeping encryption key on Encryption Server.

US Patent No. 20110276806 discloses methods and systems for receiving a request for a virtual disk and creating a virtual disk that includes the virtual disk attributes identified in the request or determined by an organization's security policies. The created virtual disk can then be encrypted and in some aspects, an encryption key for the encrypted virtual disk can be stored in an encryption key database. Upon creating and encrypting the virtual disk, the virtual disk can be transmitted to a client. The client, upon receiving the encrypted virtual disk, can mount the virtual disk into the client system. The encrypted virtual disk may be stored as a file within an unencrypted virtual disk, and the unencrypted virtual disk backed up to a local or remote storage location.

US Patent No. 20110271279 discloses a secure virtual machine approach to securely distributing and running virtual machines. This approach addresses the inherent insecurity of mobile virtual machines by authenticating a user before establishing a specialized virtualization runtime environment that includes a file system driver inserted into the host operating system to provide secure access to a virtual machine by authorized hypervisors only. Further described is the creation of a secure virtual machine package that includes the various components used to perform the operations of installation, user authentication and establishment of the specialized virtualization runtime environment.

BRIEF SUMMARY

One aspect of the present invention provides a system for securing information on a virtual server in a cloud environment, comprising: (i) a cloud encoder on the virtual server, comprising a communication module, a configuration service, a background service and an encoder filter, as well as a protection policy database and an event logger, all of which are interconnected, and (ii) a key manager and a configuration manager associated with an owner of the information and connected to the communication module of the cloud encoder via a secured communication link, wherein: upon initiation of the virtual server, the cloud encoder is arranged to receive and store a protection policy from the configuration manager, and during operation of the virtual server, the encoder filter is arranged to receive at least one encryption key from the key manager place the received key(s) in a memory of the virtual server, and use the placed encryption key(s) to encrypt and decrypt information within the virtual server according to the received protection policy.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
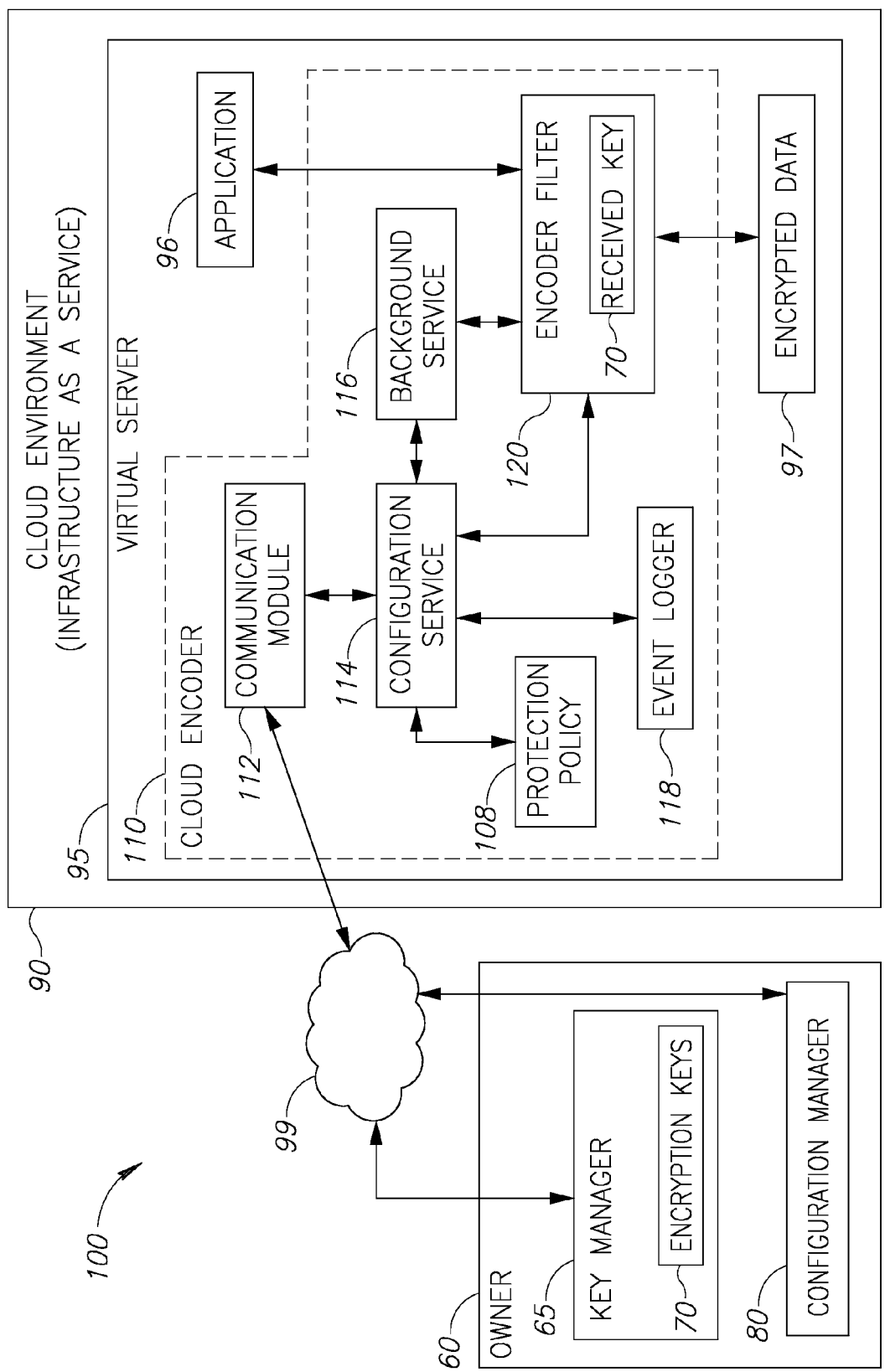
FIG. 1 is a high level schematic block diagram of a system for securing information on a virtual server in a cloud environment, according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

It is an object of the present invention to provide a method and system for encrypting data (information) inside cloud computing system with combination of an application control and a user control implemented with a cloud encoder. The cloud encoder allows data to be encrypted everywhere in the cloud on storage devices and in communication lines such as only information owner has encryption key and may decrypt information. The cloud encoder allows trusted cloud applications and users transparent access to the protected data probably encrypted which means applications have not be modified for using encrypted data. The method comprises two main ideas which are a) using software filter technology inside cloud virtual machine for encryption and decryption data and b) keeping encryption key(s) only in the hand of owner of information out of the cloud. The information may be encrypted and decrypted "on the fly", upon trusted application request. The encryption key is loaded in appropriate filter only by permission of information owner or trusted user. The system and method may implement any of the known security approaches, including encryption, user control, application control and auditing.

The method and system for secure data (information) inside a cloud computing system, allow data to be encrypted everywhere in the cloud on storage devices and in communication lines so that only the information owner has the encryption key and may decrypt the data. The main idea is using software filter technology inside the cloud virtual machine for encrypting and decrypting data and keeping the encryption key(s) only in the hand of the owner of the information outside the cloud. The encryption key is loaded into the appropriate filter only by permission of the information owner or an allowed user. The method allows combination of data encryption with application control and user control.

In embodiments, the cloud encoder may operate on the client computer. In this case the encrypted data are sent via the internet in encrypted form and are encrypted/decrypted on the client computer which receives the encryption key from the key manager. In this case the encoder filter may be realized as a network filter or as a file filter.

The following description of the drawings elucidates some of these aspects of the invention.

FIG. 1 is a high level schematic block diagram of a system 100 for securing information on a virtual server 95 in a cloud environment 90, according to some embodiments of the invention. System 100 is a security application within the conceptual framework of infrastructure as a service (IAAS). System 100 keeps encryption keys 70 by information owner 60 and only uses the keys transiently on virtual server 95.

System 100 comprises a cloud encoder 110 associated with virtual server 95 which is installed by owner 60 irrespectively of the provider of cloud environment 90. Furthermore, cloud encoder 110 is arranged to be moved together with virtual server upon transferring virtual server 110 to a different cloud environment 90 and may be thus removed from former cloud environment 90 and installed upon new cloud environment 90 by owner 60. Cloud encoder 110 may be realized directly on virtual server 95 or be realized on a client computer (not shown).

As encryption keys 70 are kept by owner 60, system 100 comprises a key manager 65 holding encryption keys 70 and a configuration manager 80 that are associated with owner 60 and are connected to a communication module 112 of cloud encoder 110 via a secured communication link 99.

Cloud encoder 110 comprises communication module 112, a configuration service 114, a background service 116 and an encoder filter 120, as well as a protection policy database 108 and an event logger 118, all of which are interconnected. Encoder filter 120 controls information requests by applications 96 from a source of data 97 e.g. including encrypted data 97. Communication module 112, configuration service 114 and background service 116 may be realized as independent programs or parts of one program (executable modules).

Upon initiation of virtual server 95, cloud encoder 110 is arranged to receive and store a protection policy from configuration manager 80 at protection policy database 108. For example, configuration service 114 may request encryption keys 70 from key manager 65 associated with information owner 60. Key manager 65 may transmit keys 70 via a high security protocol (e.g. SSL, SSH or HTTPS). Configuration service 114 then loads the received encryption key 70 to encoder filter 120 together with predefined rules controlling its usage. When a working application 96 generates a data request, it is filtered by encoder filter 120. Encoder filter 120 defines whether the demanded data are encrypted, checks (using protection policy 108) whether the calling application has the appropriate access rights and whether the user which initiated the request has the appropriate encryption key, and then decrypts the demanded data if all conditions are satisfied.

The protection policy may be modeled in various manners, according to the structure of virtual server 95 and its usage configuration, and in association with the type of information encryption.

For example, the information may be file encrypted and the protection policy may comprise trusted applications and trusted users. In this case only named (trusted) applications and named (trusted) users have assigned access rights to the protected information. In another example, the information may be user encrypted, encryption keys 70 may comprise a plurality of user specific encryption keys 70, and the protection policy may comprises an association of information segments with trusted users and respective trusted applications.

System 100 may use a single encryption key 70 to encrypt and decrypt all information on virtual server 95. Alternatively, information segments may be encrypted using different encryption keys 70, such as user specific encryption keys 70.

File encryption may comprise a single encryption key. For every virtual server inside cloud 90, a single Encryption Key is generated, which is used for encryption and decryption of all demanded information inside virtual server 95, but every virtual server has its own encryption key so that one encryption key is applicable to one virtual server. Communication module 112 is realized as internal inside the target operation system. Encoder filter 120 is a file filter. Encryption policy 108 defines files which have to be encrypted and decrypted.

User encryption may comprise multiple encryption keys. System 100 is integrated with a local access control system is used inside virtual server 95 by providing each user with personal rights on encryption and decryption data. Different parts of server information may be encrypted by its individual Access Encryption Key (AEK). Every user receives from key manager 65 a subset of AEK's which are used to encrypt and decrypt appropriate parts of encrypted information 97. This way allows protection with different encryption keys for different parts of data inside virtual server 95.

System 100 may comprise a single or multiple encryption keys, a trusted application list, a trusted users and a groups list. This configuration is the same as the configuration with multiple encryption keys, but here system 100 applies encryption keys only if it is used by trusted application and trusted user. This method puts additional data protection from Trojans and other penetrations inside working virtual server 95.

The protection policy may also comprise rules for audited information and event logger 118 is arranged to log information (e.g. problems and attempts to access the encrypted data without an appropriate key) relating to the audited information and according to the rules.

During operation of virtual server 95, encoder filter 120 is arranged to receive encryption key(s) 70 from key manager 65, place receives encryption key(s) 70 in the memory of virtual server 95 as received keys 75 and use received key(s) 75 to encrypt and decrypt information within virtual server 95 according to the received protection policy (e.g. to trusted applications upon their prompting). For example, received key(s) 75 may be placed in the memory of the kernel driver of virtual server 95 and automatically disappear when the virtual server system is stopped (shutdown or terminated).

In this way, the encryption as well as the decryption process are invisible to the applications, and of course to the cloud service provider. In particular, the whole security mechanism is implemented within virtual server 95 and no action by the provider of cloud environment 90 is required (indeed this configuration enhances the security of the information). Encoder filter 120 may save received encryption key(s) 75 in a secure manner to enhance their security.

For example, encoder filter 120 may be arranged to obfuscate encryption key(s) 75, segment encryption key(s) 75, encrypt encryption key(s) 75 with a key stored on virtual server 95, or use a combination of these methods.

Yet another embodiment may be to encrypt a part of cloud environment 90 that includes virtual server 95 and realizing communication module 112 in a loadable partition outside the encrypted part of the cloud. In a full disk encryption configuration, a virtual volume (disk) is divided at least into two partitions. Communication module 112 is realized as an external component in a loadable partition, while encoder filter 120 is a device filter which realizes full encryption for the other (main) partition which comprises the target operation system. In this case encoder filter 120 is realized as a storage filter.

Figure 2:
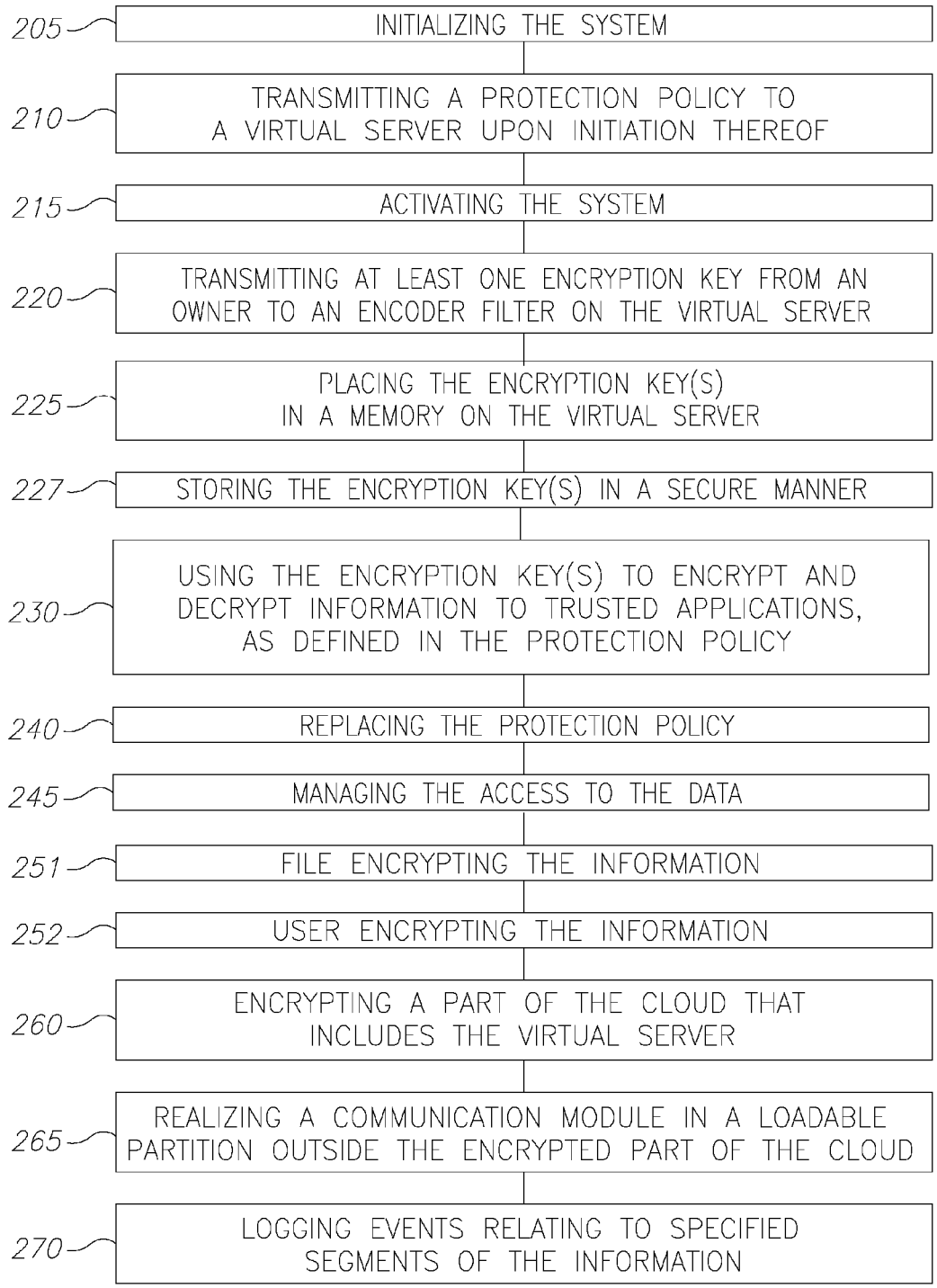
FIG. 2 is a high level flowchart illustrating a method of securing information on a virtual server in a cloud environment, according to some embodiments of the invention.

FIG. 2 is a high level flowchart illustrating a method 200 of securing information on a virtual server in a cloud environment, according to some embodiments of the invention. Method 200 is implementable as a security application within the conceptual framework of infrastructure as a service (IAAS). Method 200 keeps the encryption keys by the information owner and only uses the keys transiently on the virtual server.

Method 200 comprises the following stages: upon initiation of the virtual server, transmitting a protection policy to the virtual server (stage 210), during operation of the virtual server, transmitting (stage 220) and placing (stage 225) at least one encryption key in a memory of the virtual server, and using the at least one encryption key to encrypt and decrypt information within the virtual server according to the transmitted protection policy (stage 230). For example, the key(s) may be placed in the memory of the kernel driver of the virtual server and automatically disappear from the cloud environment when the virtual server system is stopped (shutdown or terminated), with all other components of the virtual server.

Method 200 may further comprise file encrypting the information (stage 251) and the protection policy comprises a list of trusted applications and trusted users.

Method 200 may further comprise user encrypting the information (stage 252) and the at least one encryption key may comprise accordingly a plurality of user specific encryption keys, with the protection policy comprising an association of trusted users, user related information segments and user related trusted applications.

In embodiments, the encryption key(s) may be placed in a secure manner (stage 227) to increase the security level of the encryption key(s) on the virtual server. For example, the encryption key(s) may be obfuscated, segmented or encrypted with a key stored on the virtual server.

Method 200 may further comprise encrypting a part of the cloud that includes the virtual server (stage 260) and realizing a communication module in a loadable partition outside the encrypted part of the cloud (stage 265).

Method 200 may further comprise logging events relating to specified segments of the information (stage 270).

Conceptually, method 200 comprises four sections: (i) An initial section of system configuration and policy definitions (stage 205), (ii) an activation section in which the encryption key(s) are transmitted and the protection policy is activated (stage 215), (iii) activation of a new protection policy to allow switching protection policy and keys (stage 240), and (iv) management of data access (stage 245).

The initialization of the system (stage 205) comprises the administrator picking up a base configuration and base protection configuration parameters, setting up the connection addresses and ports, the used encryption algorithms, the encryption key manager type etc. The base protection configuration parameters are transmitted to the target cloud server upon installation of the virtual server or thereafter. Furthermore, system initialization (stage 205) comprises defining the protection policy in dependence on the base configuration. As explained above, the protection policy may comprise target encrypted volumes (disks) or an encryption file list, possibly accompanied by rules for data protection such as: a protected files list, a trusted application list orusers and groups which have access rights. Additionally, the base configuration may be augmented by rules for audit. Finally, the administrator transmits the defined protection policy to the virtual server via the communication module (stage 210) and the policy is kept on the server in the encrypted file.

The activation of the system (stage 215) comprises calling the encryption keys manager by the communication module upon rebooting the virtual server, and asking for appropriate encryption key(s). If the request is approved, the key is transmitted to the encoder filter in the kernel driver and kept there (stage 220). The base configuration specifies the type of protection policy, including the number of encryption keys and their association with users or user groups. In case of multiple users, the virtual server may have a master encryption key, and a private encryption key(s) is used only to receive the master key with following access to the encrypted information. The encryption key(s) may be transmitted using one of any internet security protocols (SSL, SSH, HTTPS etc.). The encryption key is only placed inside the encoder filter (kernel driver) during the time in which the virtual server is operating and is not kept inside the cloud storage space. The encryption key(s) may be kept in the encoder filter in a secured form (e.g. obfuscated) to prevent alien access to the keys by memory scanning inside the cloud cluster. The protection policy may be transmitted (stage 210) together with the encryption key(s) (stage 220) or may be saved on the server and encrypted dependently from the picked up base configuration.

Replacing the protection policy (stage 240) to activate a new one comprises sending a new protection policy by policy and security configuration manager 80 to virtual server 95. The policy is kept in protection policy file 108. Background service 116 reads and activates the new protection policy. Background service 116 also calculates the difference between the new policy and the previously used policy and starts a background thread which encrypts files according new policy and decrypts files which have been encrypted according to the previously used policy, but not encrypted according to the new policy.

Managing the access to the data (stage 245) comprises intercepting issued I/O request relating to data 97 from applications 96 by the encoder filter, creating respective request packets and sending them it to background service 116, which supports the protection. Background service 116 answers to encoder filter 120 whether to accept or deny the application's request according to the currently supported protection policy. If the request is denied, the encoder filter generates appropriate an error state and return it to the application. If the request is accepted, the encoder filter allows access and continues working with the request. For read or write requests, the encoder filter may encrypt or decrypt appropriate data (if it is demanded). In an alternative realization, the encoder filter may support the protection policy itself, without using the background service.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system for securing information on a virtual server in a cloud environment, comprising:
    a cloud encoder associated with the virtual server, comprising a communication module, and a file filter, as well as a protection policy database and an event logger, all of which are interconnected, and
    a key manager and a configuration manager outside server of the cloud encoder, virtual server and cloud environment and associated with an owner of the information and connected to the communication module of the cloud encoder via a secured communication link,
    wherein:
    upon initiation of the virtual server, the cloud encoder is arranged to receive and store a protection policy from the configuration manager, and
    during operation of the virtual server, the file filter is arranged to receive at least one encryption key from the key manager, place the received at least one encryption key in a memory of the virtual server such that the encryption key persists on the virtual server and in the cloud environment only until the virtual server is stopped, and use the placed at least one encryption key to encrypt and decrypt information within the virtual server according to the received protection policy.

2. The system of claim 1, wherein the information is file encrypted and the protection policy comprises trusted applications and trusted users.

3. The system of claim 1, wherein the information is user encrypted, the at least one encryption key comprises a plurality of user specific encryption keys, and the protection policy comprises an association of information segments with trusted users and respective trusted applications.

4. The system of claim 1, wherein the at least one encryption key comprises a single encryption key with which all information on the virtual server is encrypted and decrypted.

5. The system of claim 1, wherein a part of the cloud that includes the virtual server is encrypted and the communication module is realized in a loadable partition outside the encrypted part of the cloud.

6. The system of claim 1, wherein the protection policy comprises rules for audited information and the event logger is arranged to log information according to the rules.

7. The system of claim 1, wherein the cloud encoder is arranged to move with the virtual server upon transferring the virtual server to a different cloud environment.

8. The system of claim 1, wherein the file filter is arranged to place the received at least one encryption key in a secure manner comprising at least one of:
    obfuscating the at least one encryption key, segmenting at least one encryption key and encrypting at least one encryption key with a key stored on the virtual server.

9. The system of claim 1, wherein the cloud encoder is realized on the virtual server.

10. The system of claim 1, wherein the cloud encoder is realized on a client computer.

11. A method of securing information on a virtual server in a cloud environment, comprising:
    upon initiation of the virtual server, transmitting a protection policy thereto from a configuration manager outside of the virtual server and cloud environment associated with an information owner, and
    during operation of the virtual server, placing at least one encryption key from a key manager outside of the virtual server and cloud environment and associated with an information owner in a memory thereof such that the encryption key persists on the virtual server and in the cloud environment only until the virtual server is stopped, and
    using the at least one encryption key to encrypt and decrypt information within the virtual server according to the transmitted protection policy.

12. The method of claim 11, wherein the protection policy comprises a list of trusted applications and trusted users.

13. The method of claim 11, wherein the at least one encryption key comprises a plurality of user specific encryption keys and the protection policy comprises an association of trusted users, user related information segments and user related trusted applications.

14. The method of claim 11, wherein the placing at least one encryption key on the virtual server is carried out in a secure manner comprising at least one of: obfuscating the at least one encryption key, segmenting at least one encryption key and encrypting at least one encryption key with a key stored on the virtual server.

15. The method of claim 11, further comprising encrypting a part of the cloud that includes the virtual server and realizing a communication module in a loadable partition outside the encrypted part of the cloud.

16. The method of claim 11, further comprising logging events relating to specified segments of the information.

17. The system of claim 1, wherein the cloud encoder further comprises a configuration service configured to request one or more encryption keys from the key manager and load the encryption keys into the file filter together with rules controlling their usage.

18. The system of claim 1, wherein the cloud encoder further comprises a background service configured to read and activate the protection policy, calculate the difference between the protection policy and a previous protection policy, start a background thread that encrypts files according to the protection policy and decrypts files which were encrypted under the previous protection policy but not under the protection policy.

19. The system of claim 18, wherein the background service is further configured to receive data request packets from the file filter and answer to the file filter whether to accept or deny data requests according to the protection policy.

20. The system of claim 1, wherein the protection policy comprises at least one of a) a list of trusted applications and trusted users; and b) an association of information segments with trusted users and respective trusted applications.

* * * * *